United States Patent [19]

Nicoloff et al.

[11]  4,307,839
[45]  Dec. 29, 1981

[54] VARIABLE EXIT AREA RAMJET NOZZLE

[75] Inventors: George B. Nicoloff; Clark Kerr, Jr., both of San Diego, Calif.

[73] Assignee: General Dynamics Corporation, San Diego, Calif.

[21] Appl. No.: 968,348

[22] Filed: Dec. 11, 1978

[51] Int. Cl.² .......................................... B64C 15/06
[52] U.S. Cl. ............................................. 239/265.39
[58] Field of Search ................... 60/271; 239/265.11, 239/265.15, 265.19, 265.33, 265.37, 265.39

[56] References Cited

U.S. PATENT DOCUMENTS

| 3,040,517 | 6/1962 | Ryden et al. | 60/271 X |
| 3,079,752 | 3/1963 | Thielman | 239/265.15 |
| 3,441,221 | 4/1969 | Naud et al. | 239/265.39 X |

Primary Examiner—Andres Kashnikow
Attorney, Agent, or Firm—John R. Duncan; Frank D. Gilliam

[57] ABSTRACT

A ramjet missile with a variable size exhaust nozzle formed by a plurality of flaps having heat resistant blocks displaced circumferentially about the nozzle which are latched within the divergent contour of the nozzle during missile climb condition and extendable radially into the exhaust nozzle exit area to reduce the size thereof for missle cruise and descent. These heat resistant blocks are jetisonable so that the nozzle exit area may be increased to its original size upon the missile return to low level flight condition. Actuators are also provided for operating the flaps for unlatching, extending and jetisoning the heat resistant blocks at the appropriate time.

9 Claims, 11 Drawing Figures

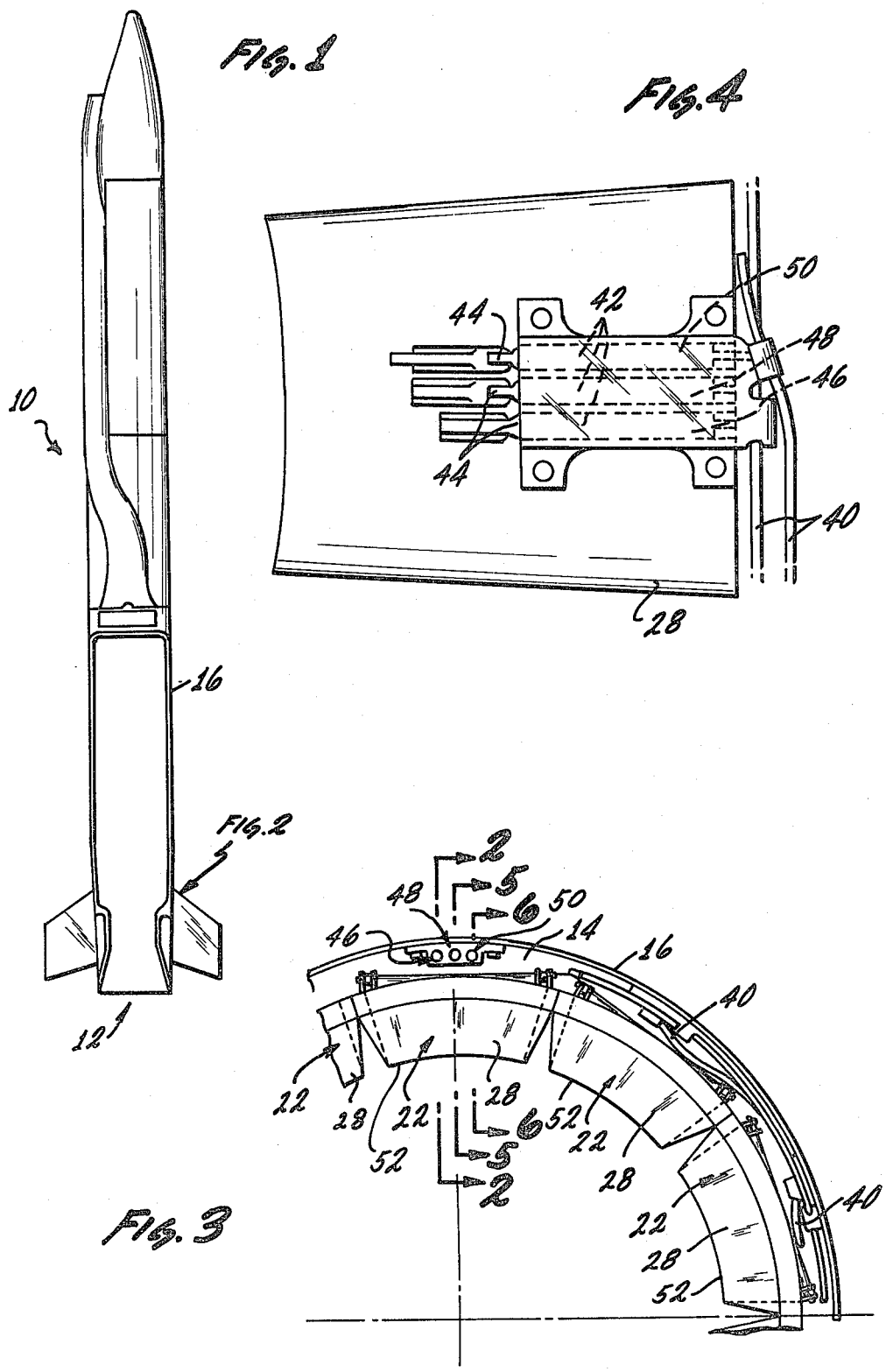

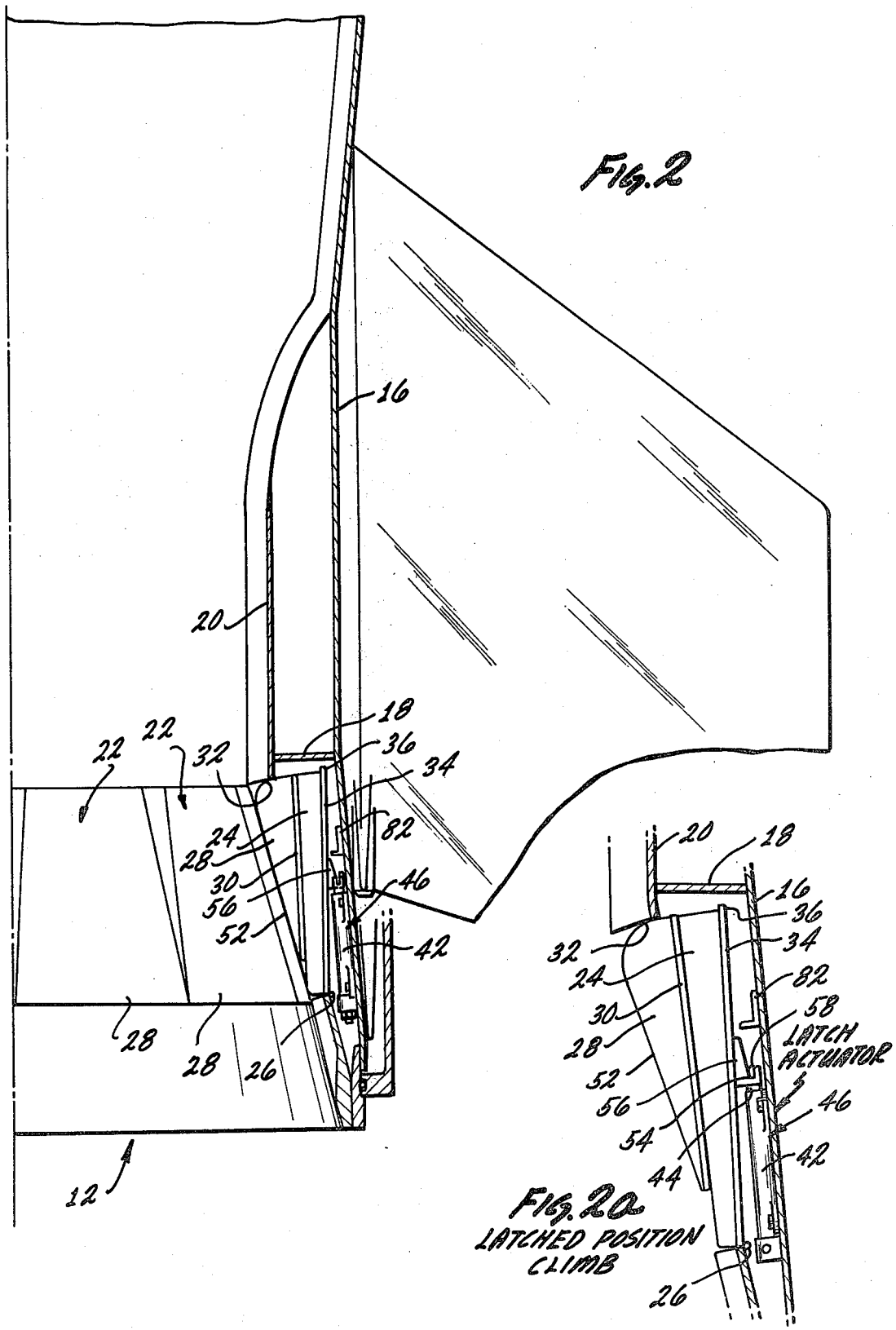

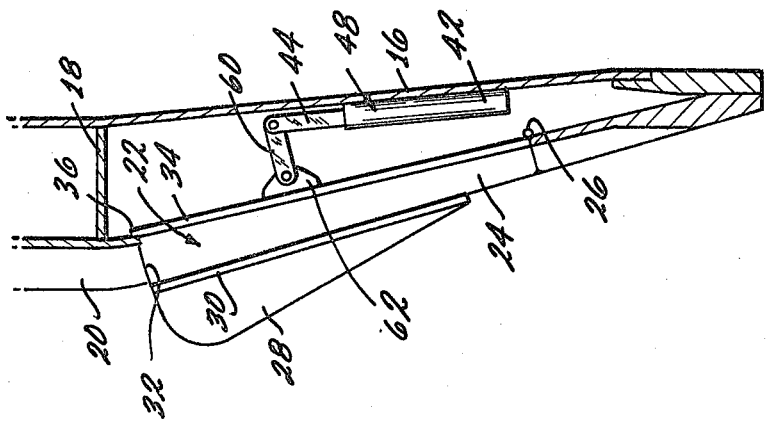
Fig. 5a. EXTENDED POSITION CRUISE-DESCENT
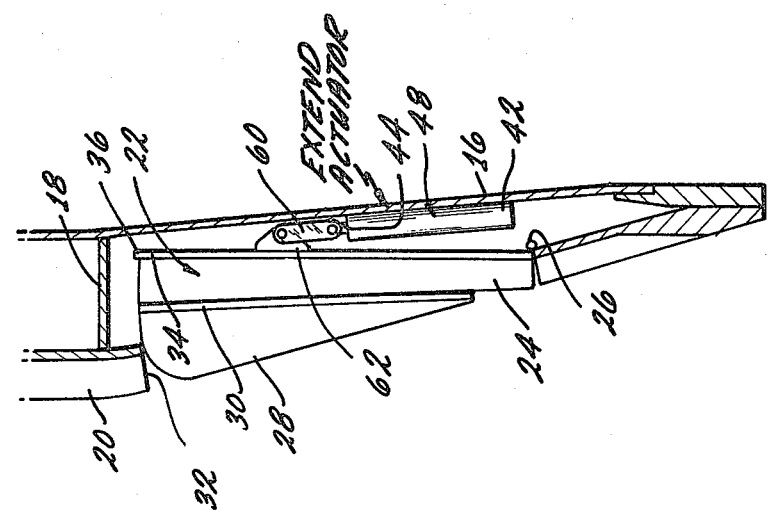
Fig. 5. RETRACTED POSITION CLIMB
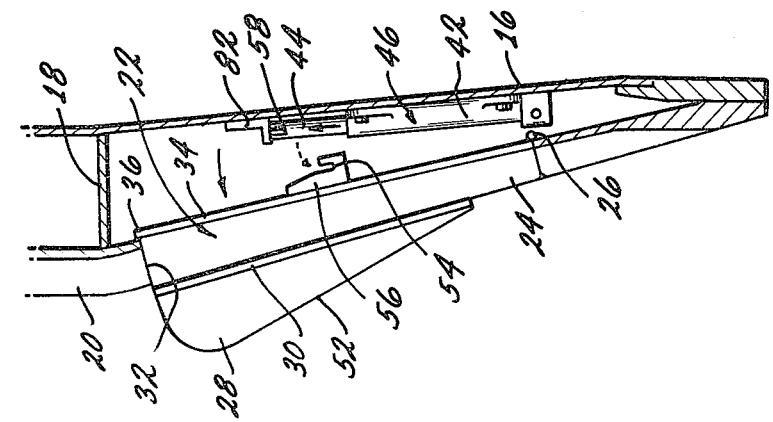
Fig. 2b. UNLATCHED CRUISE-DESCENT

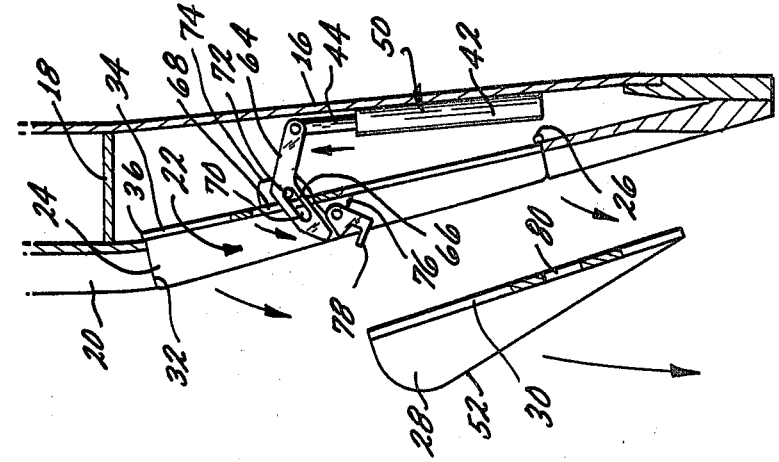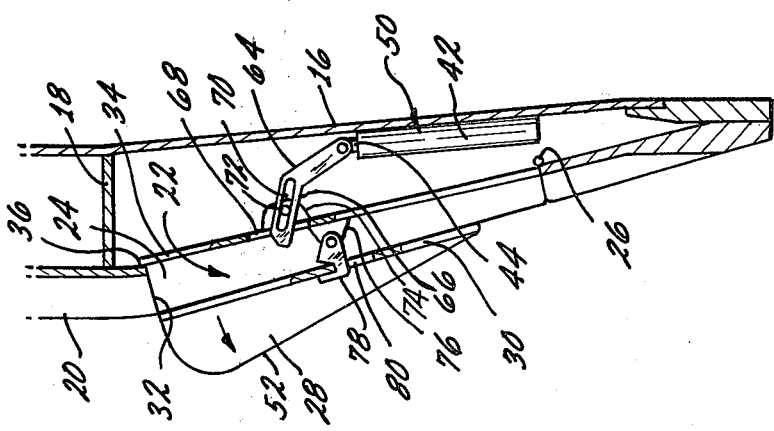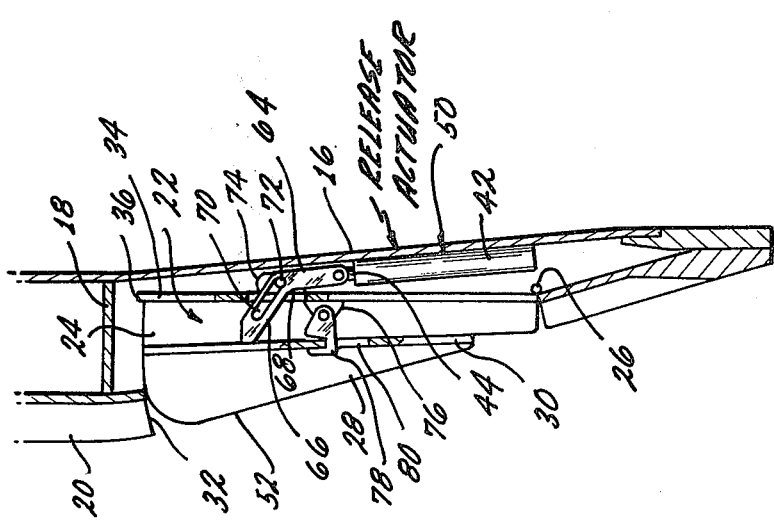

VARIABLE EXIT AREA RAMJET NOZZLE

BACKGROUND OF THE INVENTION

This invention relates in general to ramjet exhaust nozzles and more particularly to variable ramjet exhaust nozzles.

It is recognized that ramjet exhaust nozzle sized for boost take off speed is inherently inefficient at cruise speed. It is also recognized that if the nozzle exit area can be varied to match operating conditions, fuel economy and thus the range of the missile can be extended. These operating conditions include not only climb and cruise but also low level flight after descent.

There are a number of prior art patents directed to variable exhaust nozzles. Reference is made to the U.S. Pat. No. 4,049,199 to Nightingale, No. 3,040,517 to Ryden et al, No. 3,229,457 to Rowe et al and No. 3,079,752 to Thielman.

The Nightingale nozzle discloses master and slave pedals for varying the area of a gas turbine exhaust nozzle but none of the pedals are jetisonable for low level flight after descent.

The Ryden et al rocket nozzle provides a booster nozzle for climbing conditions which is released after serving its useful function.

The Rowe et al rocket nozzle changes shape during ascent of the rocket to a high altitude and means are shown for actuating the adjustment means during this performance but no means is provided for changing the rocket upon descent and low level conditions.

The Thielman nozzle provides for variable expansion of the exhaust nozzle by means of a plurality of concentric rings which are jetisoned when the rocket reaches the end of its climb.

There are, of course, a number of other prior art patents directed to this subject matter in addition to the foregoing including the U.S. Patent to Harrison No. 3,329,089 having a booster nozzle which is releasable from the vehicle and discloses a means for accomplishing this release and the U.S. Pat. No. 3,441,221 to Naud et al which like Nightingale utilizes flaps for varying a propulsion nozzle together with actuators for moving the flaps.

However, none of the foregoing meet the needs of a ramjet propelled missile by providing a large exhaust nozzle area for the missile climb to cruise altitude, reduces the exit area for better fuel economy for cruise and descent by extending heat resistant blocks into the exit area and again increases the exit area by jetisoning the heat resistant blocks for high speed low level run in.

Accordingly it is an object of this invention to provide the efficiency of the ramjet powered missile by providing a large exhaust nozzle exit area for missile climb to cruise altitude, reduce the exit area for better fuel economy for cruise and descent by heat resistant blocks into the exit area and again increase the exit area by jetisoning the heat resistant blocks for high speed sea level run-in.

SUMMARY AND ADDITIONAL OBJECT OF THE INVENTION

The exhaust nozzle for a ramjet propelled missile which accomplishes the foregoing objects comprises a plurality of hinged flaps with heat resistant blocks circumferentially displaced about the nozzle near the exit area and radially displaceable within the exhaust nozzle to reduce the exit area. The blocks are within the contour of the divergent conical nozzle for missile climb and are extended into the exit area at cruise altitude and descent. These blocks are jetisonable so that the nozzle exit area may be increased to its original size for low level run-in. Means are also provided for operating the flaps with their heat resistant blocks which perform three functions, that of unlatching, extending and jetisoning the heat resistant blocks.

From the foregoing it can be seen that a more specific object of this invention is the provision of radially displaceable flaps with heat resistant blocks which vary the nozzle exit area of a ramjet propelled missile, which when retracted for missile climb, a large exhaust exit area is presented and, upon reaching cruise altitude, the jetisonable blocks are extended into the nozzle exhaust area and after descent the exit area is increased to its original size by a jetisoning of blocks for high speed sea level run-in.

Still another object of this invention is to provide in a ramjet missile exhaust nozzle mechanisms for performing function of latching, extending, and jetisoning heat resistant blocks at the appropriate time.

BRIEF DESCRIPTION OF THE DRAWINGS

FIG. 1 is a side view of a ramjet missile shown, partly in section, to show the divergent exhaust nozzle, FIG. 2 is an enlarged detail side view of a portion of the exhaust nozzle constructed in accordance with the teachings of this invention, FIG. 2a, is a portion of the exhaust nozzle enlarged to show one of the "latch" actuators in detail, FIG. 2b, is a side view of a flap in extended position, taken along the line 2—2 of FIG. 3, and showing the "latch" actuator, FIG. 3 is a detailed end view of a portion of the exhaust nozzle of FIG. 2, FIG. 4 is a plan view, enlarged as compared to FIGS. 2 and 3, to show one actuating means for one of the flaps in detail, FIGS. 5 and 5a are cross-sectional views taken along line 5—5 of FIG. 3 and showing the two positions of the "extend" actuator, and FIGS. 6, 6a and 6b are cross-sectional views taken along line 6—6 of FIG. 3 and showing the three positions of the "release" actuator.

BRIEF DESCRIPTION OF THE PREFERRED EMBODIMENT

FIG. 1 shows a ramjet missile, in its entirety as 10, with an exhaust nozzle 12 shown enlarged on FIG. 1 in FIGS. 2 and 3. The missile 10 has a housing 14 which is typically formed with an outer skin 16 supported by a reinforcing structural elements 18 which also support inner plates 20 shown relatively thick to include any reinforcing means which form the exhaust nozzle 12. Exhaust nozzle 12 is also typically of a circular conical figuration diverging towards the outlet of the nozzle. In the embodiment shown, the missile is provided with a means for varying the nozzle exit area which comprise a plurality of flaps 22 each having a hinge plate 24 of the same thickness as the inner plates 20 which is pivotally connected to the missile housing 14 by a hinge pin 26 and provided with a heat resistant block 28. Each heat resistant block 28 is provided with a backing plate 30 and is formed with a two way taper, ie, the block is thinner but wider near the hinge pin 26 and thicker but narrower at the other or other hinged end of the flap.

This configuration of the blocks as a group conforms to the general contour of the divergent exhaust nozzle when the flaps 22 are in their retracted position as shown in FIG. 2 and allows the flaps to be extended into the nozzle area without interference.

In the embodiment shown, the inner plates 20 are provided with openings 32 to accomodate the heat resistant blocks when the flaps are in the retracted position and the hinge plates 24 span these openings 32. The inner wall plates 34 of each of the hinge plates 24 are, however, larger than the openings 32, ie, they extend from the hinge pin 26 across the openings 32 and beyond so that the ends opposite the hinge for stops, as at 36, limiting the movement of the flaps in the extended position. In this latter position it is to be noted that the hinge plates 24 conform to, or form part of, the inner plates 20 forming the divergent nozzle configuration. The importance of this will be apparent in the following discussion of FIGS. 2,2a,2b, and 5–6b, hereinafter.

The flaps 22 are each provided with actuating means in the form of a plurality of actuators hydraulically or pneumatically operated from a suitable source of fluid pressure (not shown) connected by lines 40. Each actuator is a one-way type and comprises a cylinder 42 fixed to the stationary part of the missile housing 14 having a piston actuated rod 44 and is designated according to its function in the operation of the flaps 22. Thus, a first actuator 46 is called a "latch" actuator since it performs a function of holding the flaps retracted or "latched", where the heat resistant blocks 28 conform to the contour of the diverging exhaust nozzle. "Extend" actuator 48 causes the flaps 22 to pivot about hinge pin 26 so that the heat resistant blocks 28 are "extended" into the flow of exhaust gases and narrow the nozzle exit area, and finally, "release" actuator 50 "releases" the heat resistant blocks 28 from the hinge plates 24 so that the flaps, in extended position, now conform to the contour of the diverging nozzle for a maximum nozzle exit area.

FIGS. 2, 2a, 2b and 5, 6b, show positions of the flaps under various flight conditions and show the operation of the three actuators 46, 48 and 50 in performing their respective functions during these flight conditions. Actually, because there are three actuators, "latch", "extend", and "release", each actuator must accommodate the other according to the position of the flaps in flight conditions as will be clear from the detailed description hereinafter.

CLIMB CONDITION

FIGS. 2, 2a 5 and 6, represent the condition of the flaps under climbing condition where maximum nozzle area is required. In this flap condition, the heat resistant blocks 28 are within the housing 14 and the outer faces 52 of the blocks conform to the contour of the divergent nozzle. FIG. 2a shows the "actuator" latch 46 in its fully retracted position where a hook means 54 formed in a first flange 56 permanently attached to the inner wall plate 34 is engaged by a complimentary hook 58 on the piston rod 44. Flap 22 is thus held retracted.

FIG. 5, shows the "extend" actuator 48 with its piston rod 44 also fully retracted. Piston rod 44 of this actuator is provided with a linkage mechanism in the form of a link 60, pivotly connected to piston rod 44 and to a second flange 62 which, like flange 56, is permanently connected to the inner wall plate 34. In this fully retracted position, link 60 of this "extend" actuator 48 is parallel to the center line of the actuator and generally parallel to the outer skin 16 of the missile.

Also, as shown in FIG. 6, the "release" actuator 50, like the "extend" actuator in FIG. 5, is provided with a linkage mechanism connected to its piston rod 44. This linkage mechanism comprises an angularly formed link with a pair of legs 64 and 66. In the position of FIG. 6, leg 64 parallels the skin 16 of the missile and is in line with the center line of the "release" actuator and pivotally connected to piston rod 44 while the other leg 66 extends at an angle to leg 64 and through an aperture 68 in the inner wall plate 34. Leg 66 is provided with a lost motion connection, ie, an elongated slot 70 in which a pivot pin 72 moves. This pivot pin 72 is connected to a third flange member 74 which like flanges 56 and 62 is permanently attached to the inner wall plate 34.

It is noted also that the inner wall plate 34 is also provided with an inwardly extending flange 76, positioned aft of the pin 22 and is provided with a hook means 78 pivotedly connected to this flange 76. This hook means extends through a slot 80 in the backing plate 30 of the heat resistant block 28 and engages one edge of this slot 80 to hold the heat resistant blocks on the hinge plate 24.

CRUISE/DESCENT CONDITION

While the foregoing FIGS. 2a, 5 and 6 show the three actuators when the missile is in a climb condition, FIGS. 2b, 5a, and 6a, show the position of the flap 22 with the heat resistant blocks 28 in a missile cruise and descent condition where the heat resistant blocks extend considerably into the exit area of the nozzle thus reducing the exit area size for maximum fuel economy and concomitant extended range of the missile.

Turning first to FIG. 2b, it can be seen that the "actuator" piston rod 48 has extended to full stroke thus engaging a stop mechanism in the form of a flange 82. By reason of the length of the stroke of piston rod 48, the hook mechanism 54 is freed of the hook 58 on the piston rod 44, so that the flap 22 is unlatched and free to move inwardly towards the nozzle throat which movement is accomplished by the operation of the "extend" actuator 48 more clearly shown in FIG. 5a.

Between the position of the piston rod 44 in FIG. 5, the piston rod 44 has moved to its fully extended position. The force of the piston rod is transmitted through the link 60 and flange member 62 causing the flap 22 to pivot about hinge pin 26 forcing the flap 22 into the nozzle exit area. Here the stop mechanism 36 limits the stroke of the piston rod and the travel of the flaps 22 about their hinge pins. In this position, of course, the heat resistant blocks 28 are in the path of the flowing gases restricting flow through the outlet of the nozzle for cruise and descent flight conditions.

FIG. 6a shows the piston rod 44 of the "release" actuator 50 still in its initial retracted position because of the movement of the flap 22 to the extended position was accomodated by the lost motion connection of the linkage mechanism of the "release" actuator. The pin 72 of the lost motion connection is now at the lower end of the elongated slot 20 and the latch 78 holding the heat resistant blocks are still engaging the edge of the slot 80.

LOW LEVEL RUN-IN

Attention is now directed to the low flight or sea level run-in condition in which the operation of the "release" actuator 50 becomes functional. In this condition the piston rod 44 of the "release" actuator extends its full stroke causing the two-legged link to move about the pin 72 in the lost motion connection so that the leg 66 engages the pivotal hook 78 causing it to pivot out its pivot pin releasing the hook from the edge of slot 80 whereupon the flow of gases out of the exhaust nozzle impinging upon the forward faces of the heat resistant blocks jetison the blocks. When this happens, the nozzle is in its maximum area condition, a condition similar to the climb condition of FIGS. 2,2a, 5 and 6 for maximum thrust. It is also to be noted that the "latch" actuator 46 and "extend" actuator 48 did not interfere with the operation of the "release" actuator 50 since the flaps were already in extend position with their respective piston rods fully extended.

From the foregoing it can be seen that there is described a novel means of providing a ramjet nozzle with a variable exhaust nozzle to meet flight conditions for maximum fuel economies and extended flight conditions which is simple and to utilize jetisonable heat resistant blocks to reduce the exit area for cruise and descent but which permit the nozzle to return to its maximum area for sea level run-in with maximum thrust.

What is claimed is:

1. An adjustable exhaust nozzle for a ramjet missile, said nozzle being of the conically diverging type for discharging exhaust gases,
    a plurality of flaps located circumferentially about the exit area of the nozzle and arranged to pivot radially into the exit area,
    said flaps including plate means and heat resistant blocks releasably attached to said plate means and of a configuration to conform to the contour of the nozzle in a flap retract position and in a flap extend position where said flaps pivot radially into the exit area to reduce the exit area of the nozzle, and
    means for latching heat resistant blocks to said plate means and for releasing said heat resistant blocks from said plate means at selected times.

2. The adjustable nozzle as claimed in claim 1 wherein said plate means conforms to the contour of said nozzle upon release of said heat resistant blocks while in flap extend position.

3. The adjustable nozzle as claimed in claim 2 wherein missile climb condition is the selected time for flap retract position, wherein missile cruise and descent condition are the selected times for flap extend position, and wherein sea level run-in condition is the selected time for flap extend position and for release of said heat resistant blocks.

4. The adjustable nozzle as claimed in claim 2 wherein said means for latching and releasing said heat resistant blocks to and from said plate means comprises actuator means and linkage means, together with means on said plate means for connecting said linkage means to said plate means.

5. The adjustable nozzle as claimed in claim 4 wherein said actuator means comprises three separate actuator means each with a piston rod and responsive to an energy source for actuating said linkage means by moving the piston rods from a first position to a second position.

6. The adjustable nozzle as claimed in claim 5 wherein said three actuator means comprise,
    a latch actuator having a hook, and wherein said means for connecting said linkage means to said plate means comprises hook receiving means for engaging said hook when the latch actuator piston rod is in said first position and for disengaging said hook when said latch actuator piston rod is in said second position,
    an extend actuator and wherein said means for connecting said linkage means to said plate means comprises flange means attached to said linkage means and arranged so that movement of the extend actuator piston rod from said first position to said second position actuates said linkage means causing said flaps to pivot about their hinges thus urging said heat resistant blocks radially into the exit nozzle area,
    said extend actuator being operable only after said latch actuator piston rod is in its second position, and
    a release actuator and wherein said linkage means includes means having a lost motion connection and wherein said means for connecting said linkage means to said plate means comprises a flange means connected to said linkage means through said lost motion connection,
    a second flange on said plate means including a hook means and engagable by said linkage means,
    the lost motion connection being operable to accomodate the actuation of said extend actuator linkage means,
    said linkage means of said release actuator having a hook engaging means engagable upon movement of the piston rod of said release actuator from said first position to said second position to unhook said heat resistant blocks from said plate means whereupon said heat resistant blocks are jetisoned and said plate means forms a potion of the divergent nozzle.

7. The adjustable nozzle as claimed in claim 6 wherein said latch actuator has a stop means for limiting the movement of said latch actuator piston rod at its second position.

8. The adjustable nozzle as claimed in claim 7 wherein said extend actuator has a stop means which limits the movement of said extend actuator piston rod and its second position.

9. The adjustable nozzle as claimed in claim 8 wherein said stop means for said extend actuator comprises an extension of said plate means.

* * * * *